US010049393B1

(12) United States Patent
Cearns et al.

(10) Patent No.: US 10,049,393 B1
(45) Date of Patent: Aug. 14, 2018

(54) OFFERING A REQUESTED UNAVAILABLE ITEM

(71) Applicant: Amazon Technologies, Inc., Seattle, WA (US)

(72) Inventors: Angela Cearns, Mercer Island, WA (US); Abhinav Tiwari, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 846 days.

(21) Appl. No.: 14/500,396

(22) Filed: Sep. 29, 2014

(51) Int. Cl.
*G06Q 30/00* (2012.01)
*G06Q 30/06* (2012.01)

(52) U.S. Cl.
CPC ..... *G06Q 30/0603* (2013.01); *G06Q 30/0605* (2013.01); *G06Q 30/0619* (2013.01)

(58) Field of Classification Search
CPC .......... G06Q 30/06; G06Q 30/0601–30/0643; G06Q 30/08
See application file for complete search history.

(56) References Cited

U.S. PATENT DOCUMENTS

| 7,233,885 | B1 * | 6/2007 | Larabee | ................ G06F 17/50 700/98 |
| 2002/0010685 | A1 * | 1/2002 | Ashby | .................... G06Q 20/02 705/80 |
| 2003/0200156 | A1 * | 10/2003 | Roseman | ............... G06Q 30/02 705/26.44 |
| 2005/0216365 | A1 * | 9/2005 | Lagge | ................ G06Q 30/0611 705/26.4 |
| 2015/0106229 | A1 * | 4/2015 | Lyman | ............... G06Q 30/0639 705/26.9 |
| 2016/0343037 | A1 * | 11/2016 | Nicholas | ................ G06Q 30/02 |

OTHER PUBLICATIONS

Measuring and mitigating the costs of stockouts. Eric T. Andersen, Gavan J. Fitzsimons, Duncan Simester. Management Science. Nov. 1, 2006. (Year: 2006).*

* cited by examiner

*Primary Examiner* — William J Allen
(74) *Attorney, Agent, or Firm* — Kilpatrick Townsend & Stockton LLP

(57) ABSTRACT

Techniques for offering an item that may be otherwise unavailable from an electronic marketplace may be provided. For example, based on receiving information about the item from a consumer, a template describing the item may be generated. Information based on the template may be transmitted to subscribed merchants and may allow one or more of the subscribed merchants to offer the item. If an offer is received, a data exchange between a corresponding merchant and the consumer may be facilitated. The data exchange may allow the merchant to offer the item to the consumer.

19 Claims, 9 Drawing Sheets

OFFERING A REQUESTED UNAVAILABLE ITEM

BACKGROUND

More and more users are turning to network-based resources, such as electronic marketplaces, to purchase items. A network-based resource may provide a user experience unmatched by a more traditional brick and mortar store. For example, the network-based resource may offer a larger and more diverse selection of items. Further, for some of the items, there may be a number of merchants with different offers. As such, a consumer may not only obtain items from an available rich selection, but may also obtain the items at the most convenient offers.

Typically, a merchant may operate a computing device to access a network-based. resource and describe and list an item as available from the network-based resource. In turn, a consumer may operate a computing device to access the network-based resource, search for available items, get related descriptions, and purchase one or more items accordingly. Thereafter, ordered items may be delivered to an address or location identified by the consumer.

BRIEF DESCRIPTION OF THE DRAWINGS

Various embodiments in accordance with the present disclosure will be described with reference to the drawings, in which.

DETAILED DESCRIPTION

Figure 1:
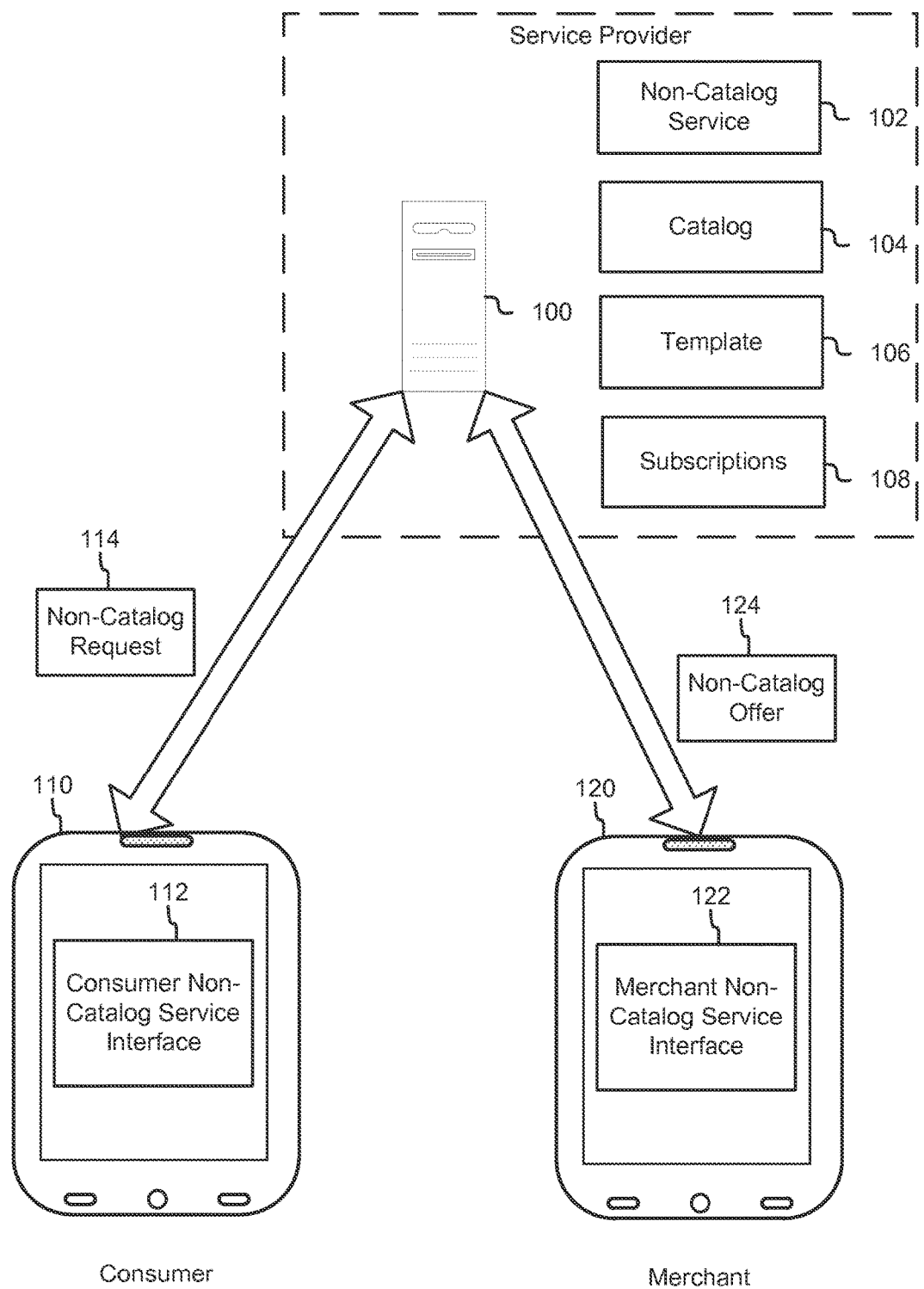
FIG. 1 illustrates an example computing system for offering an item to a consumer, according to embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, enabling a consumer to search for an item unavailable from an electronic marketplace and/or enabling a merchant to offer the item without listing the item as available within the electronic marketplace. Specifically, a service provider of the electronic-marketplace may implement a service configured to allow users (e.g., consumers) to request an item. The service may determine whether the requested item is available from the electronic marketplace. If unavailable, the service may allow the consumer to request the item from merchants that may be associated with the electronic marketplace. Based at least in part on receiving such a request from a consumer, the service may generate a template describing the item and may broadcast information about the item to a set of merchants. The merchants may have subscribed to receiving such information through the service. In turn, one or more subscribed merchants may use the service to offer the item to the consumer using the template. In response to an offer to the consumer (e.g., from the merchant), the service may facilitate a data exchange between the consumer and the merchant. The data exchange may facilitate the acquisition of the item by the consumer from the merchant. For example, the data exchange may include further information about the item, the offer, an acceptance of the offer, a commitment to provide the item within a certain time-frame, a commitment to a certain item quality, a quality of service, a level of customer service, and/or other information.

To illustrate, Evelyn may be a fashion enthusiast that follows the latest trends and styles. Having seen a stylish dress in a fashion magazine, Evelyn may snap and upload a picture of the dress from the magazine to an "I Want It" application on a computing device and add a description that she desires a particular color and size. The application may interface with a service of an electronic marketplace as described above. The service may process the image and the description and determine that the requested dress is not available from the electronic marketplace. In response, the service may provide an option through the "I Want It" application to request the dress as a custom item. Upon receiving a selection of this option, the service may generate a template describing the item. The template may include a descriptive title, the picture of the dress, information about the color and size, another picture or rendering in the requested color and size, and/or other information. The service may also broadcast information about the request to subscribed merchants. Using a computing device, a merchant may operate an "I Have It" application to receive the broadcasted information and respond with an offer. The "I Have It" application may also interface with the service of the electronic marketplace. As such, the merchant may review Evelyn's request and use the generated template to respond back with an offer specifying a price and a time frame for delivering the dress. In turn, Evelyn may receive this information and accept the offer through her application. The service may notify the merchant accordingly through the "I Have It" application and may facilitate payments, disbursement of funds, delivery tracking, and/or other features.

As such, a consumer's experience may be enhanced because of the capability to obtain items that may otherwise be unavailable from an electronic marketplace. A merchant's experience may similarly be enhanced because of the capability to offer the item by using an already generated template. In other words, the template may save the merchant overhead and resources. For example, the merchant need not go through a conventional process of describing and listing the item as available from the item before, or even after, the consumer requests the item. In addition, the service may allow an improved overall service level of the electronic marketplace. Beyond allowing a better match between supply and demand, the service may increase computing efficiency in searching for and offering items. For example, computing efficiency may be effected to databases containing information about items and computer memory usage tier searching the databases and generating templates and offers.

In the interest of clarity of explanation, the embodiments are described in the context of an electronic marketplace, service providers, items, merchants, and consumers. Nevertheless, the embodiments may be applied to any network-based resource (e.g., a web site or a web page), any item that may be tangible (e.g., a product) or intangible (e.g., a digital product), any service provider (e.g., a provider of a network-based resource or a provider that may provide an item), any item provider (e.g., a merchant, a seller, a manufacturer, a supplier, or any user offering an item), and/or any user (e.g., a consumer, an item recipient, a buyer, or any user reviewing, ordering, obtaining, purchasing, or returning an item). More particularly, the embodiments may allow a service provider to implement a service configured to allow a user to request an item unavailable from a network-based resource and an item provider to offer the item to the user. Generally, a "service" in this context may include one or more software modules executed by a computing device to implement various functions. These and other functions are further described herein below with reference to the figures.

Turning to FIG. 1, that figure illustrates an example computing environment for offering an item to a consumer. In particular, a service provider may operate a computer system to provide an electronic marketplace to consumers and merchants. An example of this computer system is further illustrated in FIGS. 4 and 5. Briefly, the computer system may implement a service, similar to the service described herein above. In the interest of clarity of explanation, this service is shown in FIG. 1 as a "non-catalog service 102." The non-catalog service 102 may be configured to receive information about an item and, accordingly, search a catalog 104. The search may indicate whether the item is available from the electronic marketplace or not. For example, merchants desiring to offer items through the electronic marketplace may interface with a catalog service (not shown in FIG, 1) to describe and list the items. As such, the catalog 104 may represent a structure for identifying the items as available from the electronic marketplace. In an embodiment, the catalog 104 may include a page (e.g., a network-based or web-based page) for each available item. In other embodiments, other structures for identifying the available items may also be used.

If the item is available from the electronic marketplace, the non-catalog service 102 may offer or may interface with other services (e.g., the catalog service) to offer the item through the electronic marketplace from associated merchants. However, if the item is unavailable, the non-catalog service 102 may create a template 106 for nonetheless offering the item as a non-catalog item. The template 106 may describe various features of the item to allow merchants to review and offer the item. This description may be derived from the received information about the item, such as data provided by a requesting consumer. In other words, the template 106 may be generated and populated without any effort or burden on the merchants. in an embodiment, the template 106 may be a modified version of a page from the catalog 104. This modified version may include a bare minimum amount of information to allow merchant offers. For example, the modified version may include a title field, a description field, and/or optionally a price range field.

The non-catalog service may further track requests for items and/or offers, requests that may not have offers, requests that may have been popular, accepted offers, rejected offers, and other item-related information. This information can be analyzed to determine trends and provide various analytics. For example, the non-catalog service can apply various machine learning, regression algorithm, pattern recognition, and/or other predictive models across various parameters to derive the analytics and associated metrics. The parameters can include words, tags, item types, seasons, and/or geographical regions associated with the requests and offers. The analytics may identify trends and support predicting consumer demand and merchant supply. The non-catalog service may provide such analytics to consumers and merchants, which may result in an improved user experience. For example, a consumer may be able to identify and join a certain trend (e.g., a fashion trend). In turn, a merchant may be able to identify and cater to the certain trend.

In addition to searching the catalog 104 and generating the template 106, the non-catalog service may be configured to manage subscriptions 108. This may allow consumers to request non-catalog or unavailable items and merchants to monitor such requests and submit offers accordingly. In an embodiment, the subscriptions 108 may represent accounts for consumer and/or merchants. An account may store preferences of a corresponding user (e.g., a consumer or a merchant), settings and configurations, a usage history, past requests or offers, and/or other information. The subscriptions 108 may also be related to applications installed on computing devices of the user and interfacing with the non-catalog service 102. In other words, a subscription of a consumer may allow the consumer to interface with the non-catalog service 102 to request an item. A subscription of a merchant may allow the merchant to interface with the non-catalog service 102 to offer the item independently of the catalog 104. As such, the subscriptions 108 may allow the non-catalog service 102 to broadcast information about requested items to subscribed consumers and merchants, such that a subscribed consumer may monitor requests of other consumers, and such that a subscribed merchant may monitor requests from one or more consumers.

In comparison, a consumer may operate a computing device 110 to search for and obtain an item available or unavailable from the electronic marketplace. An example of the computing device 110 is further illustrated in FIG. 5. Generally, the computing device 110 may be referred to as a consumer computing device or a user computing device. In addition, unless otherwise indicated explicitly or from context, a "consumer" or a "user" as used herein may refer to the computing device 110 in the interest of clarity of explanation.

The computing device 110 may provide a consumer non-catalog service interface 112 for interfacing with the non-catalog service 102. The consumer non-catalog service interface 112 may include an application executed on a processor of the computing device 110. An example of the consumer non-catalog service interface 112 is further illustrated in FIG. 2. Briefly, the consumer non-catalog service interface 112 may allow the consumer to provide information about an item, such as an associated description and transmit this information to the non-catalog service 102. Based on a response from the non-catalog service 102, the consumer non-catalog service interface 112 may display to the consumer an indication that the item is unavailable from the electronic marketplace and an option to request the item from an unspecified merchant(s) or as a non-catalog item. The consumer may further use the consumer non-catalog service interface 112 to make such a request (shown in FIG.

1 as a non-catalog request 114), receive notifications about offers from merchants, and further exchange data to accordingly obtain the item.

A merchant may similarly operate a computing device 120 to monitor requests for non-catalog items and to offer such items independently of the catalog 104. An example of the computing device 120 is further illustrated in FIG. 5. Generally, the computing device 120 may be referred to as a merchant computing device or a user computing device. In addition, unless otherwise indicated explicitly or from context, a "merchant" may refer to the computing device 120 in the interest of clarity of explanation.

The computing device 120 may provide a merchant non-catalog service interface 122 for interfacing with the non-catalog service 102. The merchant non-catalog service interface 122 may include an application executed on a processor of the computing device 120. An example of the merchant non-catalog service interface 122 is further illustrated in FIG. 3. Briefly, the merchant non-catalog service interface 122 may allow the merchant to monitor consumer requests for items unavailable from the electronic marketplace, receive trends and analytics about such requests, and respond with offers (shown in FIG. 1 as a non-catalog offer 124). The non-catalog offer 124 for a non-catalog item may be based on a corresponding template 106. For example, the merchant non-catalog service interface 122 may display a summary of a requested item (e.g., a title) linked to a corresponding template 106. Upon a selection of the summary (e.g., by clicking a link or an interface object), the merchant non-catalog service interface 122 may further interface with the non-catalog service 102 to receive information from the template 106 or a copy of the template 106 itself and may display this information to the merchant. The merchant may use the merchant non-catalog service interface 122 to provide further data for a non-catalog offer 124. The data may include a price estimate for the requested item, a delivery date estimate, a comment or question regarding a feature of the requested item, and/or other data. The non-catalog service 102 may receive this data, add it to the template, and transmit the updated template to the requesting consumer or may transmit this data directly to the consumer (e.g., to the consumer non-catalog service interface 112). In either case, the non-catalog service 102 may facilitate a data exchange between the consumer non-catalog service interface 112 and the merchant non-catalog service interface 122 such that the consumer can obtain the item from the merchant.

Upon completing the data exchange (e.g., the consumer accepts the offer and the merchant commits to providing the item), the merchant non-catalog service interface 122 may allow the merchant to further offer the item to potential future consumers as an available item from the electronic marketplace. For example, the merchant non-catalog service interface 122 may display an option to add the item to the catalog 104. In an embodiment, if the merchant selects this option, the corresponding template 106 may be associated with the catalog 104. For example, a new catalog page may be generated and populated with information from the template 106. The merchant can further add any necessary data to the new catalog page to complete the process of listing the item as available from the electronic marketplace.

By implementing the non-catalog service 102 and interfacing with the consumer non-catalog service interface 112 and the merchant non-catalog service interface 122, the service provider can enhance the experiences of the consumers and merchants. In particular, the service provider can enable a consumer to obtain an item that may be otherwise unavailable from the electronic marketplace. The service provider can also reduce the necessary overhead and resources of a merchant to offer an item as a catalog item of the electronic marketplace. Offering an item as a catalog item may involve a merchant registering and getting credentials for using the electronic marketplace, describing features of the item, applying for a unique identifier (e.g., a universal product code—UPC—or a service provider specific identification number), and other efforts. Even when such efforts are undertaken, there may be no guarantees that any consumer may ever purchase the item and, thus, the merchant may not see a return on investment. This can be particularly true for new merchants or new items and can create challenges for entering a certain market. In contrast thereto, by generating templates based on consumer input and allowing the merchant to offer the item accordingly as a non-catalog item, the service provider can effect a paradigm shift that better matches supply and demand. The merchant can monitor customer demand and react accordingly. Only after seeing a real demand, the merchant can offer the item with minimum effort.

Figure 2:
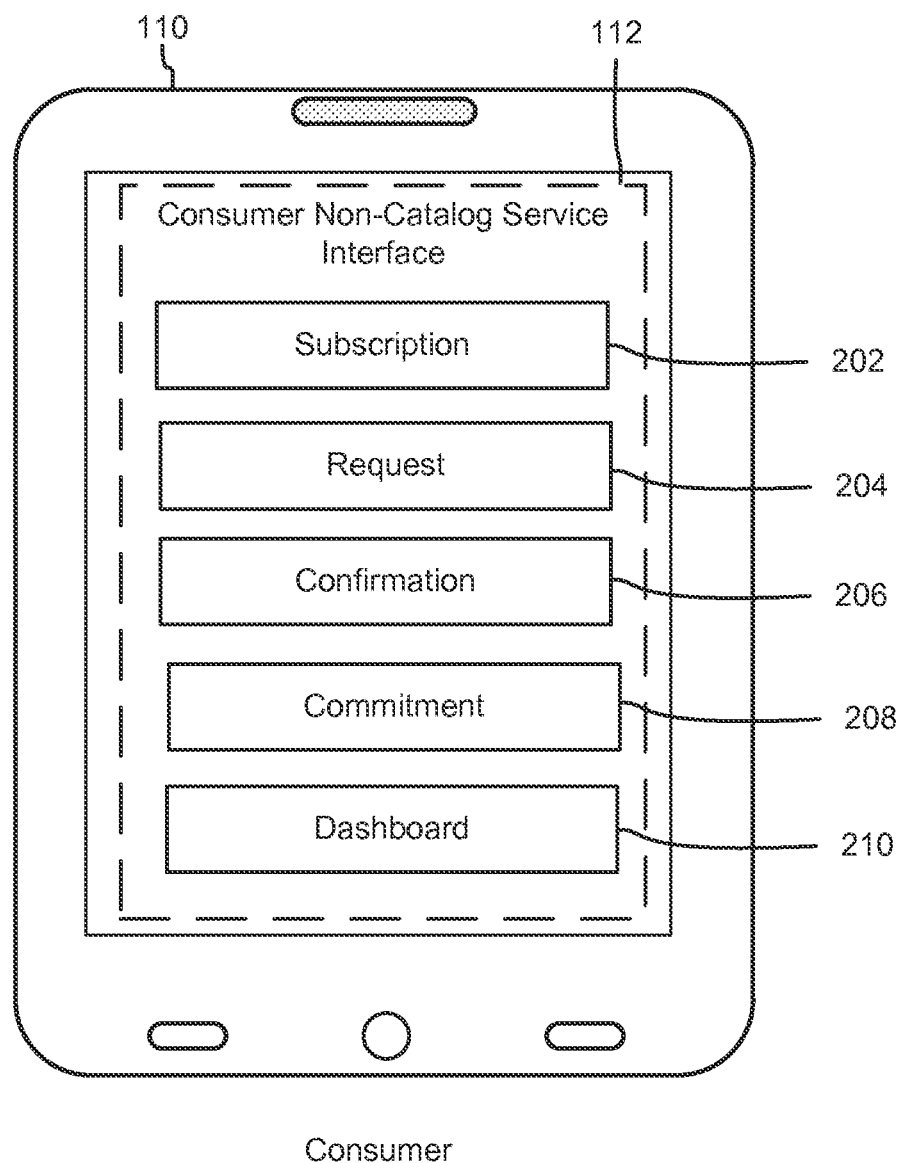
FIG. 2 illustrates an example computing device of a consumer for requesting an item, according to embodiments.

Turning to FIG. 2, that figure illustrates an example computing device of a consumer for requesting an item. The illustrated computing device may correspond to the computing device 110 and may provide a consumer non-catalog service interface 112 of FIG. 1. As explained herein above, the consumer non-catalog service 112 may allow a consumer to provide information about an item, receive an indication that the item is unavailable from an electronic marketplace, provide an option to request the item from. an unspecified merchant or as a non-catalog item, complete a data exchange with a merchant to obtain the item, and monitor requests of other consumers.

To facilitate such consumer interactions, the computing device 110 may be configured to provide the consumer non-catalog service interface 112 to use touch screen and/or other technologies. The consumer non-catalog service interface 112 may include one or more windows that may display outputs of and may allow inputs to one or more processes. A web browser is an example of such processes and may be configured to present various types of information about the item. This information can be organized using several components such as a subscription 202 for subscribing to a non-catalog service, a request 204 for requesting an item, a confirmation 206 for confirming aspects of the request and/or the item, a commitment 210 for committing to an associated offer from a merchant, and a dashboard (or dashboard interface) 210 for presenting information about requests from other consumers and other offers of merchants. For example, the computing device 100 may execute the browser and connect to the non-catalog service to retrieve and display the information on the consumer non-catalog service interface 112. It should be apparent to a person of ordinary skill in the art that other processes may be used such as, for example, an application programming interface (API). Also, it should be apparent to a person of ordinary skill in the art that, although FIG. 2 illustrates the components as being simultaneously displayed in a same window of the consumer non-catalog service interface 112, this simultaneous presentation may not be necessary. Instead, some of the information may be presented in separate windows, in separate tabs of the same window of the consumer non-catalog service interface 112, or in other presentation formats.

Generally, a "component" may represent a module configured to perform a function. The module may include hardware, software implementable on hardware, or a combination of both. For example, the module may include computer-readable instructions that, when executed on a processor, configure the processor to perform the function. The subscription 202, request 204, confirmation 206, commitment 208, and dashboard 210 components may interface via the consumer non-catalog service interface 112 with a non-catalog service, This interface may allow the non-catalog service to facilitate a data exchange such that a request can be transmitted to merchants, an offer can be transmitted to the consumer, and a transaction between the consumer and one or more of the merchants can be completed.

The subscription 202 component can be configured to allow a consumer to subscribe to a non-catalog service. The subscription may enable requesting and obtaining non-catalog items and monitoring requests of other consumers and other offers from different merchants and associated trends. In an example, the consumer may use the subscription 202 component to identify or filter displayed information about the other requests and offers based on various parameters. The parameters may include words, tags, item types, seasons, and geographical regions associated with these requests and offers.

The request 204 component can be configured to allow a consumer to request an item. For example, the consumer may use the request 204 component to input information about an item. In turn, the request 204 component may display an indication (e.g., in a field) whether the item is available from an electronic marketplace or not. If unavailable, the request 204 component may display a request option (e.g., in another or same field) to request the item from unspecified merchants or as a non-catalog item.

The information about the item can be inputted according to various techniques. For example, the computing device 110 can be connected to a keyboard or a mouse or some other input device. In another example, the consumer non-catalog service interface 112 may provide a virtual keyboard and touchscreen capabilities. In both examples, the consumer may input text describing the item. In yet another example, the computing device 110 may include camera, a barcode or R scanner, or some other input device to capture and provide a picture of the item, the barcode, or the QR to the consumer non-catalog service interface 112 or another application of the computing device 110. In a further example, the computing device may include an audio detector for receiving and providing and audio description of the item to the consumer non-catalog service interface 112 or another application of the computing device 110. The computing device 110 may then locally process, by using the consumer non-catalog service interface 112 or another application of the computing device 110, any of this information (e.g., the text, picture, and/or audio) to generate a description of the item and transmit this description to a non-catalog service. Alternatively, the computing device 110 may directly transmit this information to the non-catalog service that, in turn, can generate the description.

The confirmation 206 component can be configured to allow a consumer to confirm a request for an item. For example, the confirmation 206 component may display to the consumer a generated description of an item and a confirmation option to confirm that the description is correct. In turn, the consumer may edit the description (e.g., change a description of a particular feature of the item, add or adjust a price range for the item) and select the confirmation option. This selection may be transmitted to a non-catalog service that, in turn, can use the selection and the description to generate a template for the item.

The commitment 208 component can be configured to allow a consumer to commit to an offer of a merchant offer for a requested item. For example, the commitment 208 component may allow a data exchange between the consumer and the merchant. The data exchange can be facilitated via the non-catalog service that may interface with the consumer non-catalog service interface 112 and a merchant non-catalog service interface 122. As such, the consumer can use the commitment 208 component to answer questions of the merchant, provide design feedback, negotiate a price, request a particular delivery time frame or customer service level, agree on a payment method, and so on. Once satisfied, the consumer can select a commitment option provided by the commitment 208 component to accept, the offer and accordingly obtain the item. If dissatisfied, the consumer can use the commitment option to reject the offer.

The dashboard 210 component can be configured to allow a consumer to monitor a status of a request and information about other requests and offers. The status and information can be received from a non-catalog service. In a way, the dashboard 210 component can allow the non-catalog service to publish or broadcast data. For example, after requesting an item, the dashboard 210 component can receive and display a summary of the request and an indication whether any offer has been made and a number of such offers. The summary can he linked to a description of the item, such as to a corresponding template. If an offer has been made, the dashboard 210 component can identify the merchant and surface consumer reviews about the merchant or about items that the merchant may have previously provided. In addition, the dashboard 210 component may receive and display similar summaries of requests for other items or from other consumers and/or summaries of any respective offers. The consumer may use the dashboard 210 component to select any of these other requests and/or offers, receive additional information, join any of these requests, and/or negotiate and accept any of these offers.

The dashboard 210 component may display the data using various techniques. For example, the data can be displayed in a list, organized in tiles, or sonic other presentation format. Similarly, the dashboard 210 component may allow a consumer to scroll or flip through the data, or use some other browsing technique. In addition, the dashboard 210 component can provide an analytics tool for displaying trends and metrics about the various requests and offers. The actual data can be provided to the tool from the non-catalog service.

The subscription 202, request 204, confirmation 206, commitment 208, and dashboard 210 components may interface with each other to provide the above functions. For example, the dashboard 210 component may display the status of a requested item based on input from the commitment 208 component. In another example, the dashboard 210 component may display information about other requests based on a selected filter option from the subscription 202 component.

As such, the consumer non-catalog service interface 112 may provide an easy, simple user interface to request and accept an offer for an item, and monitor and track other requests and offers. This may result in enhancing the consumer's experience by not only providing a capability to obtain an item that may be otherwise unavailable from an electronic marketplace, but to also monitoring trends and reacting accordingly.

Figure 3:
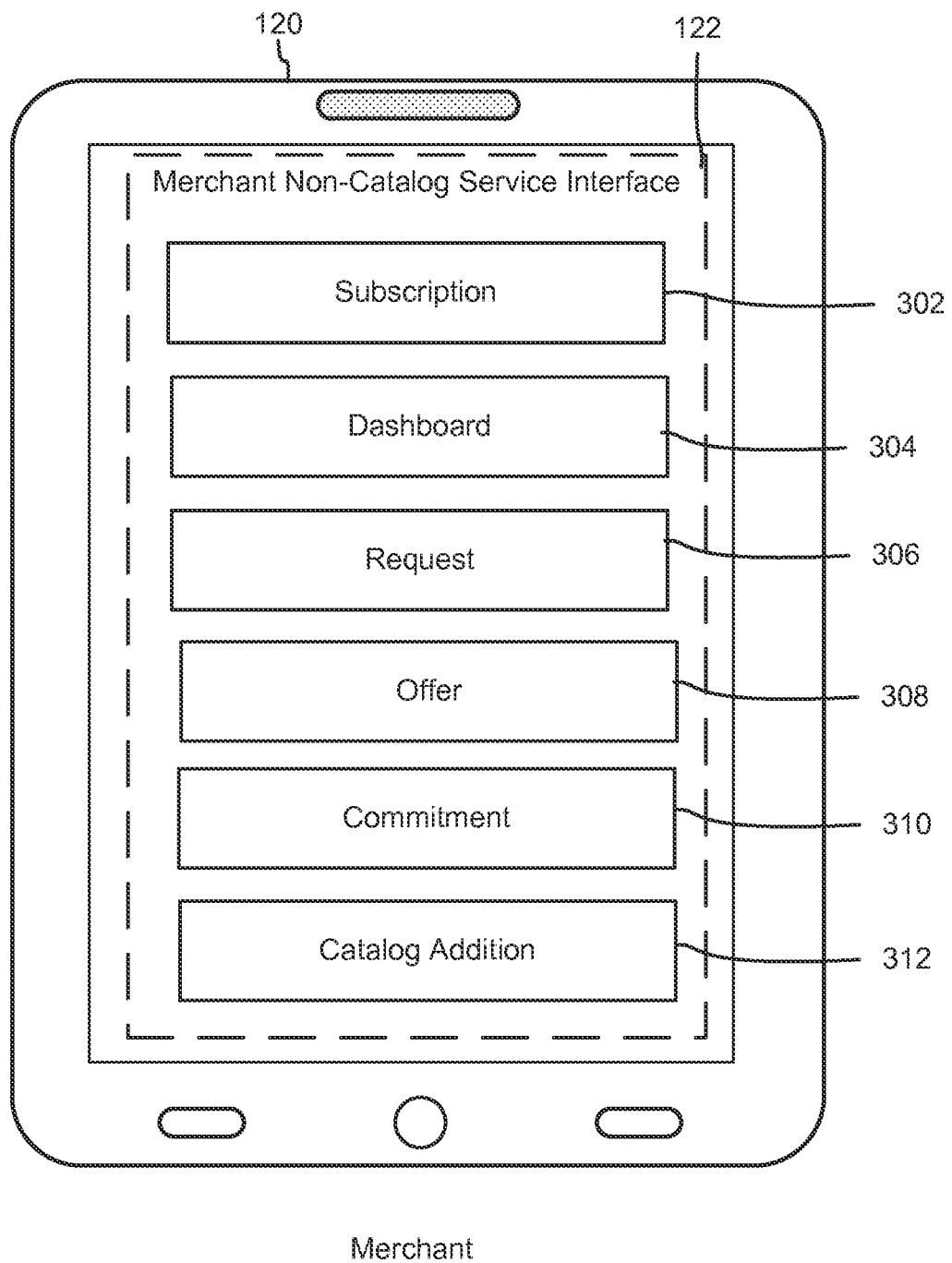
FIG. 3 illustrates an example computing device of a merchant for offering an item, according to embodiments.

Turning to FIG. 3, that figure illustrates an example computing device of a merchant for offering an item. The illustrated computing device may correspond to the computing device 120 and may provide a merchant non-catalog service interface 122 of FIG. 1. As explained herein above, the merchant non-catalog service 122 may allow a merchant to monitor requests for items, provide an option to offer the item independently of a catalog of an electronic marketplace, complete a data exchange with a consumer to provide the item, and subsequently add the item to the catalog if desired so.

To facilitate such merchant interactions, the computing device 120 may be configured similarly to the computing device 110 as described in FIG. 2, but to provide merchant functions. Such similarities are not repeated herein in the interest of clarity of explanation. The merchant non-catalog service interface 122 can be configured to provide several merchant-related components such as a subscription 302 for subscribing to a non-catalog service, a dashboard 304 for presenting information about requests of consumers and/or offers of other merchants, a request 306 for presenting information specific to a particular request, an offer 308 for offering an item in response to the particular request, a commitment 310 for committing to the offer, and a catalog addition 312 for optionally adding the item to a catalog. These various components may interface via the merchant non-catalog service interface 122 with the non-catalog service. This interface may allow the non-catalog service to facilitate a data exchange such that a request can be transmitted to merchants, an offer can be transmitted to the consumer, and a transaction between the consumer and one or more of the merchants can be completed.

The subscription 302 component may be similar to the consumer's subscription 202 and can be configured to allow a merchant to subscribe to a non-catalog service. The subscription may enable requesting and obtaining non-catalog items and monitoring requests of other consumers and other offers from different merchants and associated trends. The subscription may also allow the merchant to identify a payment disbursement method (e.g., direct disbursement to an electronic account, mailing address for checks, or other methods).

The dashboard 304 component may be similar to the consumer's subscription 202 and can be configured to allow a merchant to monitor requests, offers, and trends and use analytics tools. The monitored information can be received from a non-catalog service and displayed according to the merchant's subscription (e.g., based on selected filters).

The request 306 component can be configured to allow a merchant to receive specific information about a particular request from a non-catalog service. For example, based on a selection of a request summary provided by the dashboard 304 component, the request 306 component can interface with the non-catalog service to receive information about the request or the corresponding item from an associated template, or to receive the template itself. The request 306 component can display the data to the merchant to allow a decision of whether to make an offer or not.

The offer 308 component can be configured to allow a merchant to make an offer in response to a particular request. For example, the offer 308 component may display an offer option to bid on the item and specify a price or a price range. The offer 308 component may also display other options for defining terms and conditions of the offer, offer-related services (e.g., a certain level of customer service), or other offer-related questions or comments.

The commitment 310 component may be similar to the consumer's commitment 208 component and can be configured to allow a merchant to commit an offer for a requested item to a consumer. For example, the commitment 310 component may allow a data exchange between the consumer and the merchant via a non-catalog service. As such, the merchant can use the commitment 310 component to answer questions of the consumer, provide design feedback, upload a design proposal or item picture, negotiate a price, propose a particular delivery time frame or a customer service level, agree on a payment method, and so on. Once satisfied, the merchant can select a commitment option provided by the commitment 310 component to commit the offer and accordingly provide the item. If dissatisfied, the merchant can use the commitment option to withdraw the offer.

The catalog addition 312 component can be configured to allow a merchant to add an offered item to a catalog. For example, after committing an offer for an item to a consumer, the merchant may use the catalog addition 312 component to offer this item to other consumer at an electronic marketplace. The catalog addition 312 component may display a catalog option to facilitate this function. By selecting the catalog option, a corresponding template of the item may be received from a non-catalog service. The catalog addition 312 component may allow the merchant to edit the template and add information according to required fields for adding the item to a catalog. Once completed, the non-catalog service may receive and add the information or interface with another service of the electronic marketplace to add the item to the catalog, which may result in making the item available from the electronic marketplace.

As such, the merchant non-catalog service interface 122 may provide an easy, simple user interface to monitor and offer an item. This may result in enhancing the merchant's experience by providing a capability to offer a requested item without the need to go through listing the process on a catalog, monitor trends, and if desired adding the item to the catalog.

Figure 4:
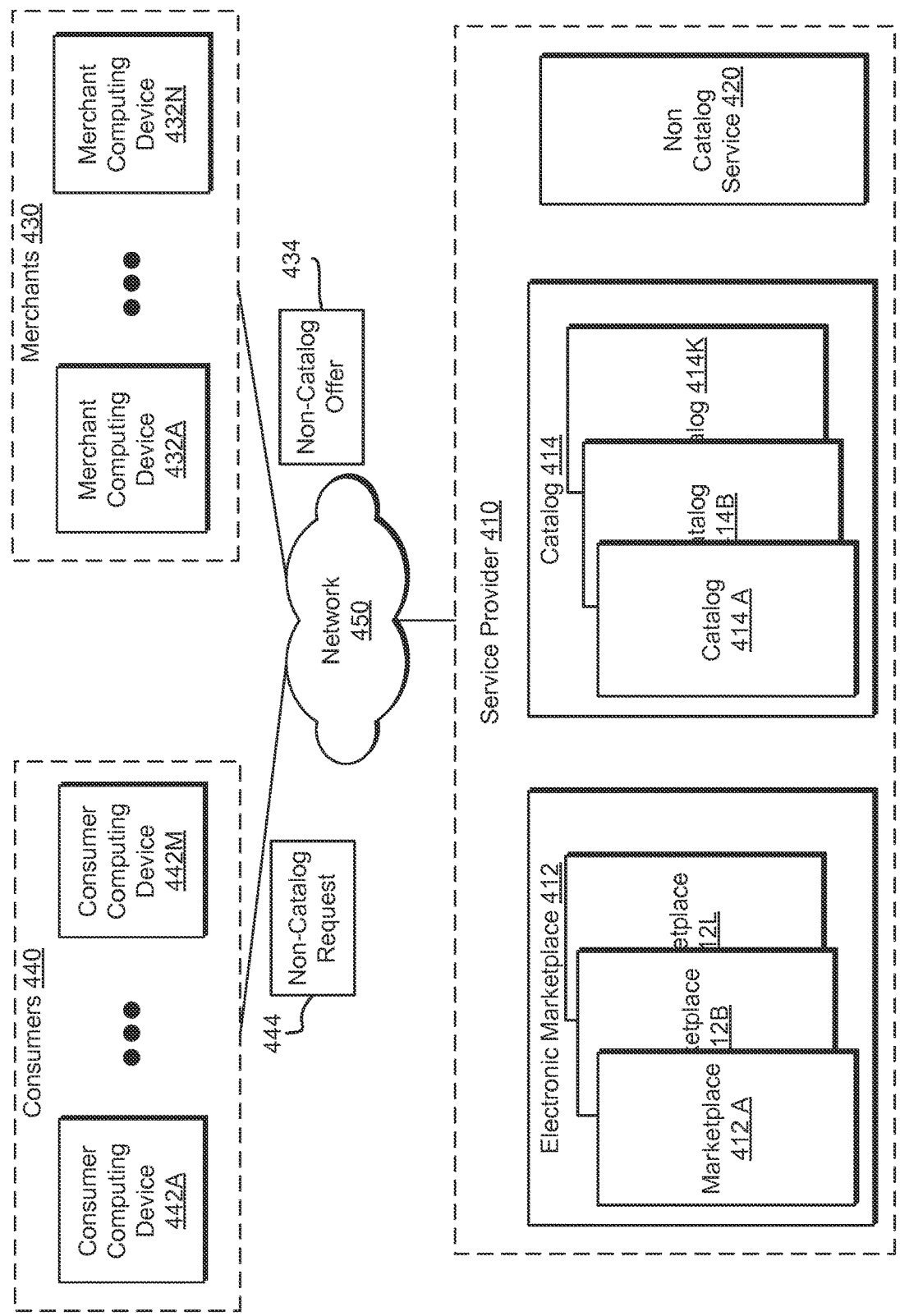
FIG. 4 illustrates an example network-based resource in association with an electronic marketplace, according to embodiments.

Turning to FIG. 4, that figures illustrates a computing environment for implementing a non-catalog service within the context of an electronic marketplace. In particular, service provider 410 of an electronic marketplace 412 may implement a non-catalog service 420, similar to the one described herein above. The non-catalog service 420 may be configured to facilitate data exchange between consumers 440 and merchants 430 of the electronic marketplace 412 such that items may be provided from the merchants 430 to the consumers 440 without needing to offer the items as available from the electronic marketplace 412.

The electronic marketplace 412 may include a plurality of platforms shown in FIG. 4 as marketplaces 412A through 412L. Each of the platforms may correspond to a particular marketplace. A marketplace may be confined to a particular geographical region, particular types of items, particular services, or other market-related divisions. Generally, a platform may be provided in the form of a network-based resource and can be associated with a top-level domain (TLD), including a generic top-level domain (gTLD), such as ".com," ".net," ".org " and/or a country code top-level domain (ccTLDs), such as ".uk," or ".cn," The various platforms may optionally, but not necessarily, have a same domain name system (DNS) root domain, such as "website-ABC" such that two platforms may correspond to "websiteABC.com.uk" and "websiteABC.com.cn."

In addition, the electronic marketplace 412 may be associated with a catalog 414. The catalog 414 may be an example of a structure for identifying items as available from the electronic marketplace 412. Other structures may also be used. The catalog 414 may represent a plurality of catalogs, shown in FIG. 4 as catalogs 414A through 414K.

Each of the catalogs 414A-K may include a collection of catalog pages. A catalog page may describe an item, include a unique item identifier (e.g., a UPC or a service provider specific identifier number) and allow the electronic marketplace 412 to offer the item to the consumer 440 as an item available that can be obtained from the electronic marketplace 412. Further, each of the catalogs 414A-K may correspond to one or more of the marketplaces 412A-L. As such, an item offered in the catalog 414 may be available in a particular marketplace (e.g., the marketplace 412A) but not in another marketplace (e.g., the marketplace 412B). In addition, a same item may be identified in more than one of the catalogs 414A-K. allowing this item to be offered in more than one of the marketplaces 412A-L. In an embodiment, each of the listing catalogs may use a different unique identifier for the same item. In this embodiment, the catalog 414 or some other component may store a table that can identify the item, the different unique identifiers, and the corresponding marketplaces.

The non-catalog service 420 may be configured to receive information about an item from a consumer, and search the catalog 414 to deter if the item is available from the electronic marketplace. If unavailable, the non-catalog service 420 may generate a template based on received information from the merchants and accordingly broadcast information about the item to subscribed merchants. Thereafter, the non-catalog service 420 may facilitate a data exchange between the consumer and one or more of the subscribed merchants to offer the item as a non-catalog item based on the template.

In an example, the non-catalog service 420 may search for an item based also on a context of a consumer. In other words, if the consumer is at a particular location (e.g., the USA), non-catalog service 420 may search the catalog 414A corresponding to the USA marketplace 412A. If unavailable, the non-catalog service 420 may indicate to the consumer that the item is not available in the particular marketplace (e.g., the USA). The non-catalog service 420 may then proceed by using the table of the catalog 414 to determine if the item is available in other marketplaces. If so, the non-catalog service 420 can return a corresponding indication to the consumer. For example, if the consumer is looking for a Bollywood movie not found in the US market (e.g., "websiteABC.com"), the consumer may receive an indication that the movie can be purchased from the Indian market (e.g., "websiteABC.com.in"). If not, the non-catalog service 420 may determine if a similar item exists across the catalogs 414A-414B and would require a customization or modification to meet the consumer's demand. For example, if the consumer is looking for a particular dress in a green color and size two, the non-catalog service 420 may determine that a similar red, size one dress is available from the electronic marketplace 412, but may require a modification such that the color is green and the size is two. If a similar item is found, the non-catalog service 420 may generate a template based on a corresponding catalog page and the necessary modifications, But if a similar item is not found the non-catalog service 420 may determine that the item is a new item that may require a new design. Accordingly, the non-catalog service 420 may generate a template based on the available information from the consumer.

To facilitate the interactions with the consumers 440 and the merchants 430, network-based documents (e.g., web pages) can be used. A network-based document of the electronic marketplace 412 may be associated with an item available from the electronic marketplace 412 (e.g., identified in the catalog 414). For example, the network-based resource may allow the merchants 430 and/or the service provider 410 to provide information for ordering the item. The network-based resource may also allow the consumers 440 to review this information and make a purchase decision. A network-based document of the electronic marketplace 412 may also be associated with an item unavailable from the electronic marketplace 412 (e.g., unidentified in the catalog 414). In this case, the network-based document can use a corresponding template to provide information to the consumers 440 for requesting the item using a non-catalog request 444 and the merchants 430 for offering the item using a non-catalog offer 434.

As such, the service provider 410 may operate the electronic marketplace 412 to facilitate interactions between the service provider 410, the merchants 430, and the consumers 440 over a network 450. Each one of the merchants 430 may operate one or more merchant computing devices 432A-N to access the electronic marketplace 412 and perform various merchant-related functions. Each one of the consumers 440 may operate one or more consumer computing devices 442A-M to access the electronic marketplace 412 and perform various consumer-related functions.

Figure 5:
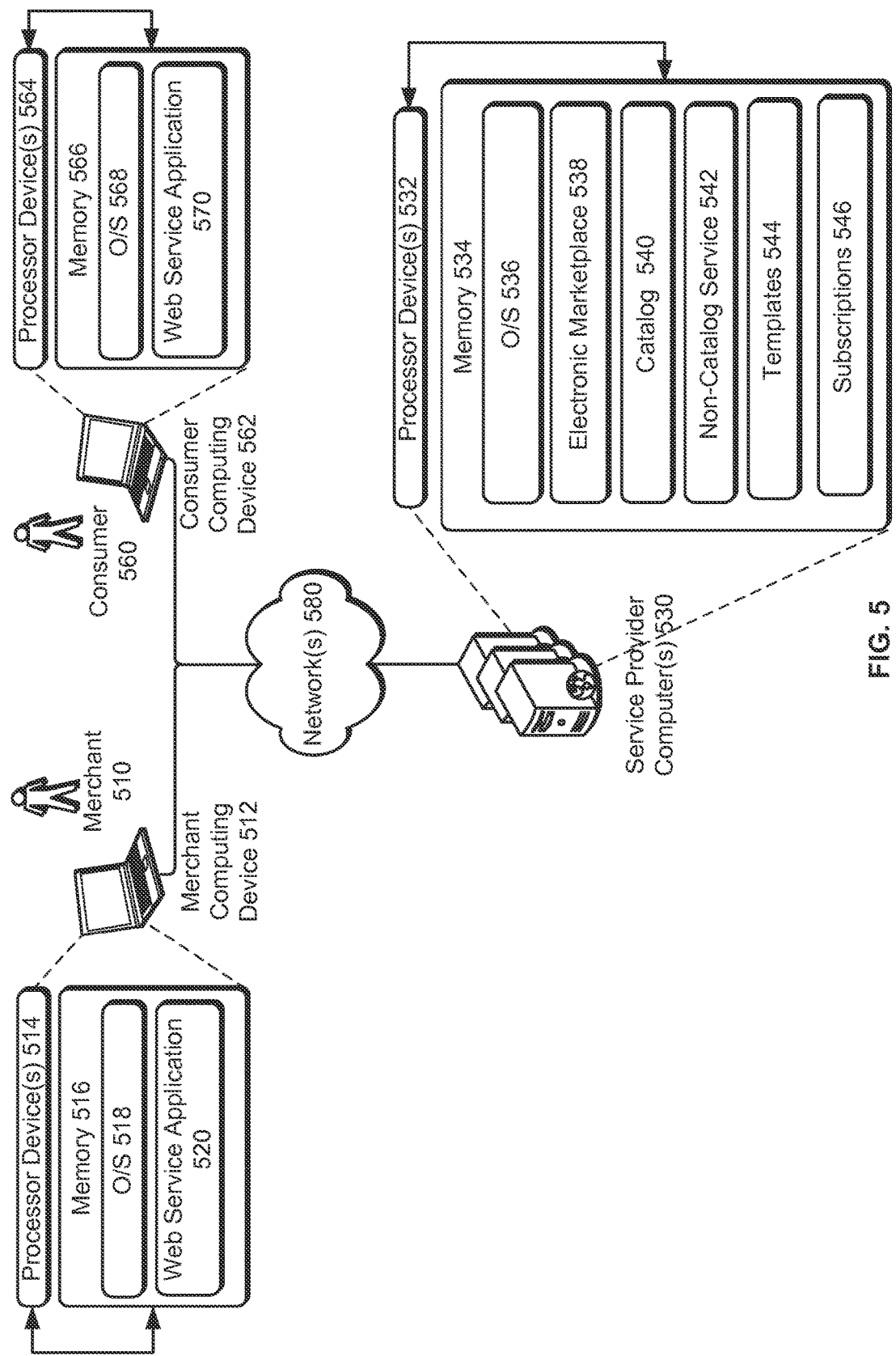
FIG. 5 illustrates an example architecture for providing a network-based resource, including at least one user device and/or one or more service provider computers connected via one or more networks, according to embodiments.

Turning to FIG. 5, that figure illustrates an example end-to-end computing environment for offering items that may be otherwise unavailable from an electronic marketplace. in this example, a service provider may implement a non-catalog service, such as the non-catalog service 420 of FIG. 4, within the context of, for example, an electronic marketplace available to users, such as the merchants 430 and the consumers 440 of FIG. 4.

In a basic configuration, a merchant 510 may utilize a merchant computing device 512 to access local applications, a web service application 520, a merchant account accessible through the web service application 520, a web site or any other network-based resources via one or more networks 580. In some aspects, the web service application 520, the web site, and/or the merchant account may be hosted, managed, and/or otherwise provided by one or more computing resources of the service provider, such as by utilizing one or more service provider computers 530. The merchant 510 may use the local applications and/or the web service application 520 to interact with the network-based resources of the service provider. These transactions may include, for example, monitoring item requests and trends, offering items for sale through and/or independently of a catalog of the electronic marketplace, and other-merchant related transactions.

In some examples, the merchant computing device 512 may be any type of computing devices such as, but not limited to, a mobile phone, a smart phone, a personal digital assistant (PDA), a laptop computer, a thin-client device, a tablet PC, etc. In one illustrative configuration, the merchant computing device 512 may contain communications connection(s) that allow the merchant computing device 512 to communicate with a stored database, another computing device or server, merchant terminals, and/or other devices on the networks 580. The merchant computing device 512 may also include input/output (I/O) device(s) and/or ports, such as for enabling connection with a keyboard, a mouse, a pen, a voice input device, a touch input device, a display, speakers, a printer, etc.

The merchant computing device 512 may also include at least one or more processing units (or processor device(s)) 514 and one memory 516. The processor device(s) 514 may be implemented as appropriate in hardware, computer-executable instructions, firmware, or combinations thereof. Computer-executable instruction or firmware implementations of the processor device(s) 514 may include computer-executable or machine-executable instructions written in any suitable programming language to perform the various functions described.

The memory 516 may store program instructions that are loadable and executable on the processor device(s) 515, as well as data generated during the execution of these programs. Depending on the configuration and type of merchant the computing device 512, the memory 516 may be volatile (such as random access memory (RAM)) and/or non-volatile (such as read-only memory (ROM), flash memory, etc.). The merchant computing device 512 may also include additional storage, which may include removable storage and/or non-removable storage. The additional storage may include, but is not limited to, magnetic storage, optical disks, and/or tape storage. The disk drives and their associated computer-readable media may provide non-volatile storage of computer-readable instructions, data structures, program modules, and other data for the computing devices. In some implementations, the memory 516 may include multiple different types of memory, such as static random access memory (SRAM), dynamic random access memory (DRAM), or ROM.

Turning to the contents of the memory 516 in more detail, the memory may include an operating system (O/S) 518 and the one or more application programs or services for implementing the features disclosed herein including the web service application 520. In some examples, the merchant computing device 512 may be in communication with the service provider computers 530 via the networks 580, or via other network connections. The networks 580 may include any one or a combination of many different types of networks, such as cable networks, the Internet, wireless networks, cellular networks, and other private and/or public networks. While the illustrated example represents the merchant 510 accessing the web service application 520 over the networks 580, the described techniques may equally apply in instances where the merchant 510 interacts with the service provider computers 530 via the merchant computing device 512 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer systems, etc.).

Similarly, a consumer 560 may utilize consumer computing device 562 to access local applications, a web service application 570, a consumer account accessible through the web service application 570, a web site, or any other network-based resources via the networks 580. In some aspects, the web service application 570, the web site, and/or the user account may be hosted, managed, and/or otherwise provided by the service provider computers 530 and may be similar to the web service application 520, the web site accessed by the computing device 512, and/or the merchant account, respectively.

The consumer 560 may use the local applications and/or the web service application 570 to conduct transactions with the network-based resources of the service provider. These transactions may include, for example, searching for items, requesting, ordering, and obtaining items that may not be otherwise offered by the merchants 510 through the electronic marketplace, monitoring trends, providing consumer reviews, and other transactions.

In some examples, the consumer computing device 562 may be configured similarly to the merchant computing device 512 and may include at least one or more processing units (or processor device(s)) 564 and one memory 566. The processor device(s) 564 may be implemented as appropriate in hardware, computer-executable instructions, firmware, or combinations thereof similarly to the processor device(s) 515. Likewise, the memory 566 may also be configured similarly to the memory 516 and may store program instructions that are loadable and executable on the processor device(s) 564, as well as data generated during the execution of these programs, For example, the memory 566 may include an operating system (O/S) 568 and the one or more application programs or services for implementing the features disclosed herein including the web service application 570.

As described briefly above, the web service applications 520 and 570 may allow the merchant 510 and consumer 560, respectively, to interact with the service provider computers 530 to conduct transactions involving items. The service provider computers 530, perhaps arranged in a cluster of servers or as a server farm, may host the web service applications 520 and 570. These servers may be configured to host a web site (or combination of web sites) viewable via the computing devices 512 and 562. Other server architectures may also be used to host the web service applications 520 and 570. The web service applications 520 and 570 may be capable of handling requests from many merchants 510 and consumers 560, respectively, and serving, in response, various interfaces that can be rendered at the computing devices 512 and 562 such as, but not limited to, a web site. The web service applications 520 and 570 can interact with any type of web site that supports interaction, including social networking sites, electronic retailers, informational sites, blog sites, search engine sites, news and entertainment sites, and so forth. As discussed above, the described techniques can similarly be implemented outside of the web service applications 520 and 570, such as with other applications running on the computing devices 512 and 562, respectively.

The service provider computers 530 may, in some examples, provide network-based resources such as, but not limited to, applications for purchase and/or download, web sites, web hosting, client entities, data storage, data access, management, virtualization, etc. The service provider computers 530 may also be operable to provide web hosting, computer application development, and/or implementation platforms, or combinations of the foregoing to the merchant 510 and consumer 560.

The service provider computers 530 may be any type of computing device such as, but not limited to, a mobile phone, a smart phone, a personal digital assistant (PDA), a laptop computer, a desktop computer, a server computer, a thin-client device, a tablet PC, etc. The service provider computers 530 may also contain communications connection(s) that allow service provider computers 530 to communicate with a stored database, other computing devices or server, merchant terminals, and/or other devices on the network 580. The service provider computers 530 may also include input/output (I/O) device(s) and/or ports, such as for enabling connection with a keyboard, a mouse, a pen, a voice input device, a touch input device, a display, speakers, a printer, etc.

Additionally, in some embodiments, the service provider computers 530 may be executed by one more virtual machines implemented in a hosted computing environment, The hosted computing environment may include one or more rapidly provisioned and released network-based resources. Such network-based resources may include computing, networking, and/or storage devices. A hosted computing environment may also be referred to as a cloud computing environment. In some examples, the service provider computers 530 may be in communication with the computing devices 512 and 562 via the networks 580, or via other network connections. The service provider computers 530 may include one or more servers, perhaps arranged in a cluster, or as individual servers not associated with one another.

In one illustrative configuration, the service provider computers 530 may include at least one or more processing units (or processor devices(s)) 532 and one memory 534. The processor device(s) 532 may be implemented as appropriate in hardware, computer-executable instructions, firmware, or combinations thereof. Computer-executable instruction or firmware implementations of the processor device(s) 532 may include computer-executable or machine-executable instructions written in any suitable programming language to perform the various functions described.

The memory 534 may store program instructions that are loadable and executable on the processor device(s) 532, as well as data generated during the execution of these programs. Depending on the configuration and type of the service provider computers 530, the memory 534 may be volatile (such as random access memory (RAM)) and/or non-volatile (such as read-only memory (ROM), flash memory, etc.). The service provider computers 530 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 534 may include multiple different types of memory, such as static random access memory (SRAM), dynamic random access memory (DRAM), or ROM.

Additionally, the computer storage media described herein may include computer-readable communication media such as computer-readable instructions, program modules, or other data transmitted within a data signal, such as a carrier wave, or other transmission. Such a transmitted signal may take any of a variety of forms including, but not limited to, electromagnetic, optical, or any combination thereof. However, as used herein, computer-readable media does not include computer-readable communication media.

Turning to the contents of the memory 534 in more detail, the memory may include an operating system (O/S) 536, code for an electronic marketplace 538, data related to a catalog 540 associated with the electronic marketplace 538, code for a non-catalog service 542, data related to template 544, and data related to subscriptions. The non-catalog service 542 may be a service similar to the non-catalog service 420 of FIG. 4, may generate the templates 544 based on input of the consumers 560, and may facilitate data exchanges between the consumers 560 and the merchants 510 based on the subscriptions 546. Although FIG. 5 illustrates the various data as stored in the memory 534, this data or portion of the data may be additionally or alternatively stored at a storage device remotely accessible to the service provider computers 530. Configurations and operations of the non-catalog service 542 are further described in greater detail below with reference to at least FIGS. 6-8.

Figure 6:
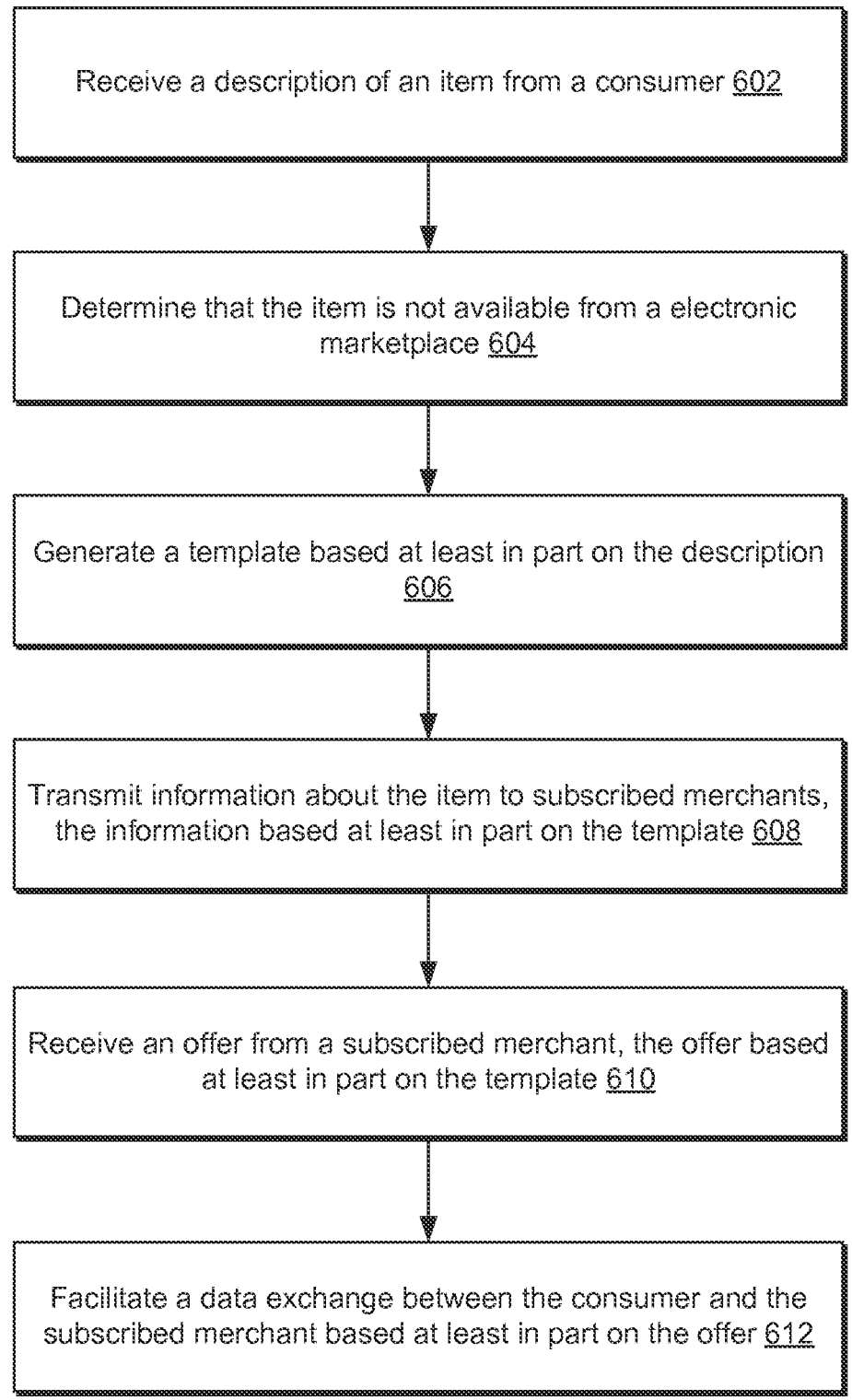
FIG. 6 illustrates an example flow for offering an item, according to embodiments.
Figure 7:
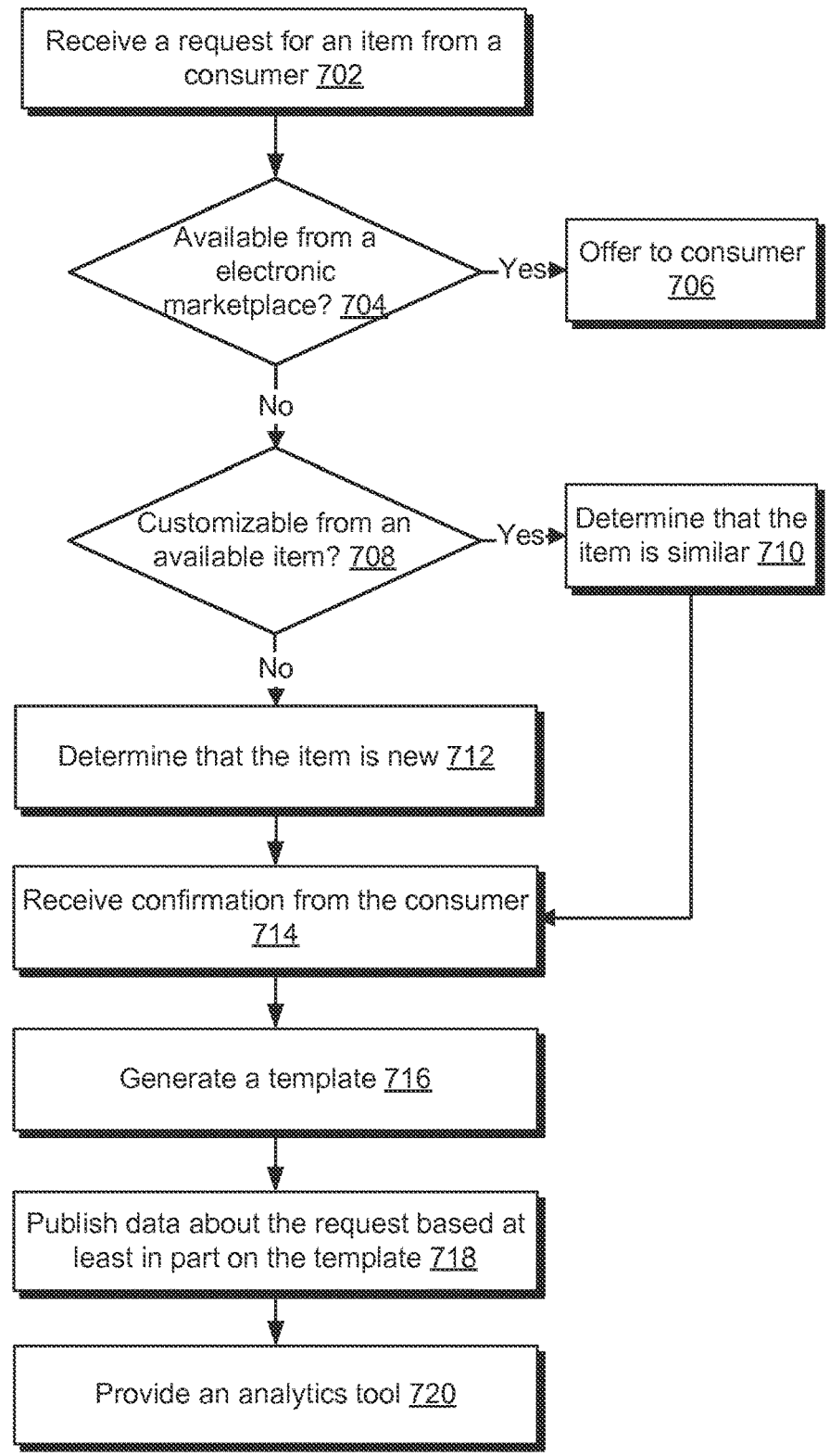
FIG. 7 illustrates an example flow for requesting an item, according to embodiments.
Figure 8:
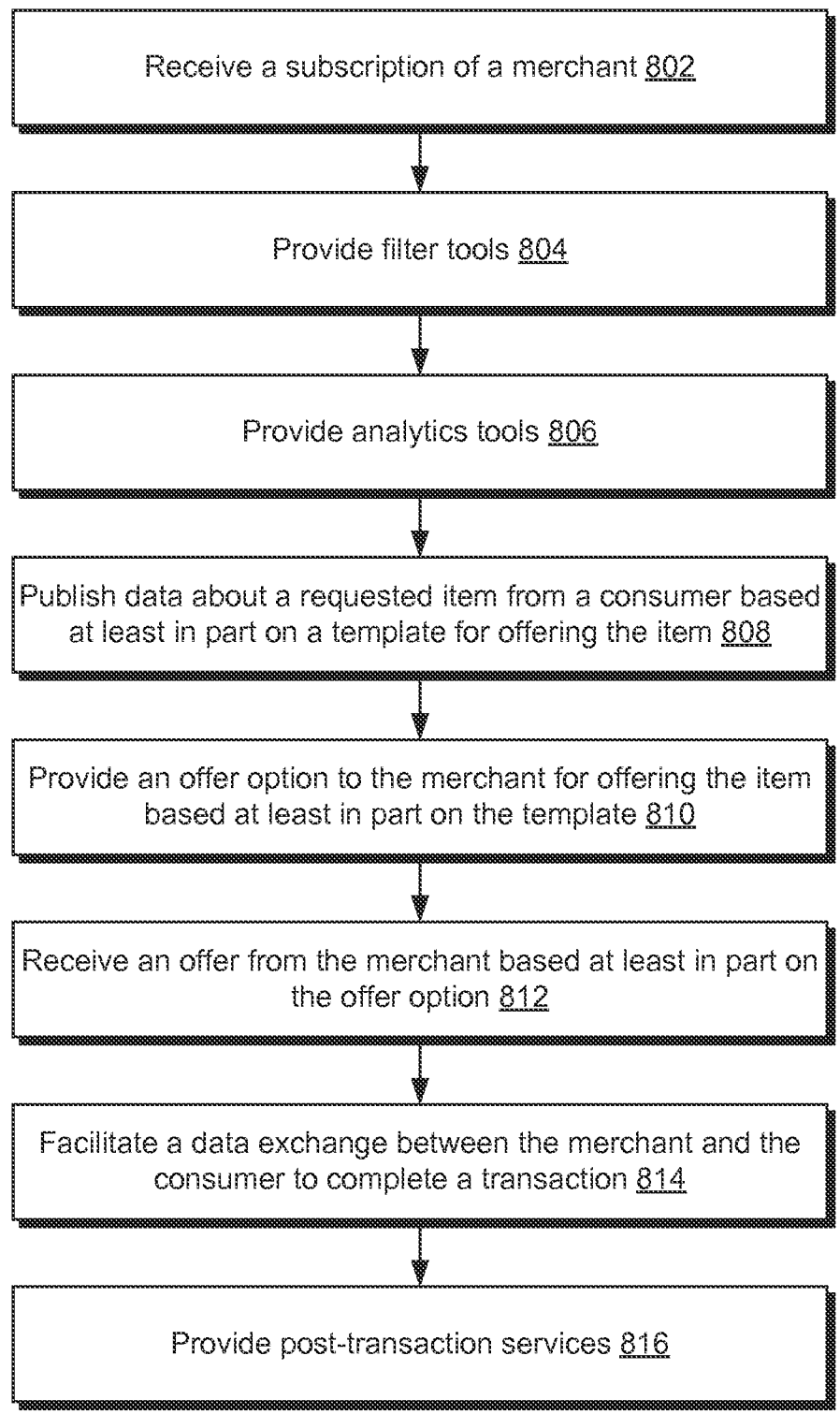
FIG. 8 illustrates an example flow for offering an item in response to a request, according to embodiments.

Turning to FIGS. 6-8, those figures illustrate example flows for offering an item that may be otherwise unavailable from an electronic marketplace. However, the flows are not limited to offering only one item, but can similarly be used to offer a plurality of items. FIG. 6 illustrates an example high-level flow for offering such an item. In comparison, FIG. 7 illustrates a more detailed example flow for processing a request of a consumer for the item, while FIG. 8 illustrates a more detailed example flow for responding to the request with an offer. Operations of the example flow of FIG. 6 may be further embodied in operations of the example flows of FIGS. 7 and 8. Thus, some operations may be similar. Such similarities are not repeated herein in the interest of clarity of explanation.

Further, in the illustrative operations, each of the operations or functions may be embodied in, and fully or partially automated by, modules executed by one or more processor devices of a computing device. Although a non-catalog service executed on a service provider computer is illustrated as performing operations of the flows, other or a combination of other services and modules may be additionally or alternatively used. Likewise, other modules, components, interfaces, or services executed on consumer and merchant computing devices may perform similar or equivalent operations. Also, while the operations are illustrated in a particular order, it should be understood that no particular order is necessary and that one or more operations may be omitted, skipped, and/or reordered.

The example flow of FIG. 6 may start at operation 602, where a non-catalog service executed on a service provider computer may receive a description of an item from a consumer. For example, a consumer may operate a consumer computing device that executes a consumer application configured to interface with the non-catalog service and with other local applications. The consumer may input a text, image, or audio description of the item using any of these applications. In turn, the description may be transmitted over a network to the service provider computer and can be received by the non-catalog service.

At operation 604, the non-catalog service may determine that the item is not available from an electronic marketplace. For example, the non-catalog service may process the received description to generate an identifier of the item. This processing can involve applying text recognition algorithms to a received text, applying image recognition algorithms to a received image, and/or audio and speech recognition and translation algorithms to received audio. The non-catalog service may use the identifier to query one or more catalogs associated with the electronic marketplace. If the item is not identified in such catalogs, the non-catalog service may determine that the item is unavailable.

At operation 606, the non-catalog service may generate a template based at least in part on the description. For example, the template may include a title and a description of the item and any other necessary information to allow merchants to offer the item. If any of the information is missing, a feedback loop may be used to collect additional information from the consumer. In an embodiment, the template may be a modified version of a catalog page from the catalog. This version may have a similar format, but may include a lower number of information fields.

At operation 608, the non-catalog service may transmit information about the item to subscribed merchants. The information can be based on the template and can represent a request for the item from the consumer. For example, the information can be copied from the template and transmitted, or a summary can be generated (e.g., the title only) and transmitted. In another example, the template itself may be transmitted. In an embodiment, the non-catalog service may broadcast the information to merchants that may have already subscribed to receiving such information. For example, the non-catalog service may access merchant subscriptions and transmit the information accordingly. In another example, the non-catalog service may broadcast the information indiscriminately. But only subscribed merchants that may have installed an application interfacing with the non-catalog service may be able to receive and access the information.

At operation 610, the non-catalog service may receive an offer from a subscribed merchant. The offer can be based on the template. For example, a merchant may operate a merchant computing device that executes a merchant application configured to interface with the non-catalog service. The transmitted information can be received and displayed at the merchant application. In response, the merchant may decide to bid on the item. Accordingly, the merchant may use the information to respond back with an offer by, for example, entering offer information using the merchant application. The non-catalog service may receive the offer information and update the template. In another example, the merchant use the merchant application to receive and update the template with the offer information and may transmit the updated template to the non-catalog service.

At operation 612, the non-catalog service may facilitate a data exchange between the consumer and the subscribed merchant based on the offer. For example, the non-catalog service may notify the consumer (e.g., via the corresponding consumer application) of the offer and allow the consumer to accept, negotiate, change, reject the offer or take another offer or other item-related actions. Any resulting updates may be received by the non-catalog service and transmitted to the corresponding merchant application. In turn, the merchant may also use the merchant application to further update or withdraw the offer. If both parties come to an agreement, the non-catalog service may facilitate a transaction between the two, such as payment and fund disbursement, and provide post-transaction services.

Turning to FIG. 7, that figure illustrates an example flow for receiving a request for an item, generating a template accordingly, and using the template to solicit offers from merchants. The example flow of FIG. 7 may start at operation 702, where a non-catalog service executed on a service provider computer may receive a request for an item from a consumer. For example, the consumer may operate a consumer computing device that executes a consumer application configured to interface with the non-catalog service. The consumer may input to the consumer application a description of the item that may be then transmitted to and received by the non-catalog service.

At operation 704, the non-catalog service may determine whether the item may be available from an electronic marketplace. For example, the non-catalog service may translate the description into an item identifier. The item identifier may then be used to search one or more catalogs. If listed in the catalog, the non-catalog service may determine that the item is available from the electronic marketplace. Operation 706 may then be performed, where the non-catalog service or another service of the electronic marketplace may offer and allow the consumer to purchase the item from the electronic marketplace. Otherwise, operation 708 may be performed.

At operation 708, the non-catalog service may determine whether the item may be customizable from an available item. In other words, the non-catalog service may assess whether the requested item is similar to an existing catalog item and to what extent a modification may be needed. This can involve inputting the description of the request item into a matching algorithm to output the available item. The non-catalog service may implement this algorithm or may interface with another service of the electronic marketplace that may do so. The matching algorithm can compare item features to assess similarities. If such similarities fall over a predefined threshold, the matching algorithm can declare that the available item may be similar. If there is more than one matching item, the matching algorithm may pick the best match. In addition, the matching algorithm can identify, based on the similarity assessment, necessary modifications to the features of the available item.

If at operation 708, the non-catalog service determines that the item is customizable, operation 710 may be performed. At that operation, the non-catalog service may determine that a similar item may exist and may identify the necessary modifications to such an item. Otherwise, operation 712 may be performed. At that operation, the non-catalog service may determine that the requested item may be a new item. In other words, this new item may not be similar to another existing item. Thus, existing information (e.g., a description, a design) may not be reused. Instead, new information may be needed.

At operation 714, the non-catalog service may receive a confirmation related to the requested item from the consumer. This may involve multiple steps to confirm data related to the item. For example, in a first step, the non-catalog service may transmit to the consumer application an indication whether the item is customizable and the necessary modification or whether the item is new. The non-catalog service may also transmit any available information about the requested item. This information can be based, on the description received from the consumer and on data from other sources. For instance, if the consumer provided a text description, the transmitted information may be the text itself. If the consumer provided an image, the transmitted information may be the image and any data (e.g., descriptive features) derived from the image. Further, if a similar item was found from a catalog, data from the catalog may be used. In turn, the consumer may use the consumer application to edit the received information, add new information (e.g., technical data, a desired price range, or other data), and submit a request to get an offer for the item. As such, in a second step, the non-catalog service may receive and use this consumer input to update the data related to the item.

At operation 716, the non-catalog service may generate a template, The template can be generated based on the description received from the consumer at operation 702. The template can also be generated based on any updated data received at operation 714 and data available from other sources. For example, if a similar existing item is available, the non-catalog service may retrieve the corresponding catalog page and generate the template using information from this page and any necessary feature modifications. If the item is new, the non-catalog service may generate the template directly from the consumer-provided information.

At operation 718, the non-catalog service may publish data about the request based on the template. For example, the non-catalog service may broadcast a summary or a description of the request or of the item. The summary and request can be linked to the template. In another example, the non-catalog service may broadcast the template itself. The broadcast can be directed to consumer applications and merchant applications interfacing with the non-catalog service. As such, subscribed consumers and subscribed merchants may receive, view, or monitor the request. In particular, the requesting consumer can get an acknowledgement that the request has been broadcasted to a community of merchants and can track a corresponding status.

At operation 720, the non-catalog service may provide an analytics tool. For example, the non-catalog service may add the request to other previously made requests. These requests may be analyzed to determine predictive trends and metrics across various parameters. The non-catalog service may transmit to the consumer application portions of the analysis such that the consumer application can display certain trends and metrics under an analytics tool.

Turning to FIG. 8, that figure illustrates an example flow for enabling a merchant to offer a requested item otherwise unavailable from an electronic marketplace and independently of listing the item in a catalog of the electronic marketplace. The example flow of FIG. 8 may start at operation 802, where a non-catalog service executed on a service provider computer may receive a subscription of a merchant. For example, the merchant may operate a merchant computing device that executes a merchant application configured to interface with the non-catalog service. The merchant may subscribe to the non-catalog service by, for example, inputting subscription information to the consumer application. In response to receiving this information, the non-catalog service may generate a subscription for the merchant.

At operation 804, the non-catalog service may provide filter tools. For example, based on the subscription, the non-catalog service may allow the merchant to subscribe to particular categories of feeds related to requested items. The categories may be associated with words, tags, item types, seasons, geographical regions, and/or other request-related parameters. As such, the non-catalog service may allow the merchant, through the merchant application, to filter what broadcasted requests should be displayed by the merchant application.

At operation 806, the non-catalog service may provide analytics tools. For example, the non-catalog service may analyze previously made requests and offers to determine predictive trends and metrics across various parameters. The non-catalog service may transmit to the merchant application portions of the analysis such that the merchant application can display certain trends and metrics.

At operation 808, the non-catalog service may publish data about a requested item from a consumer. The published data may include information about the request and/or the item such as a description of the item and a desired price range or a desired delivery timeframe. This information can be based on a template associated with the item or may include the template itself. The non-catalog service may have generated the template based on input of the consumer or of another requesting consumer. This information can be broadcasted to subscribed merchants, such that corresponding merchant applications may display the information according to applicable filters.

At operation 810, the non-catalog service may provide an offer option to the merchant for offering the item based on the template. In other words, not only information about the request and/or item may be transmitted to the merchant, but also the non-catalog service may transmit a selectable option for the merchant to offer the item. For example, the non-catalog service may cause the merchant application to display the offer option such that, if selected, the merchant can start a process for defining the offer.

At operation 812, the non-catalog service may receive an offer from the merchant based on the offer option. For example, once the merchant selects the offer option, the merchant application may display various fields for the merchant to define an offer. Once defined, the information about the offer may be transmitted to and received by the non-catalog service.

At operation 814, the non-catalog service may facilitate a data exchange between the merchant and the consumer to complete a transaction. For example, the non-catalog service can receive from and transmit to the merchant application and a consumer application associated with the consumer information and updates about the offer and the item. In addition, the non-catalog service may similarly transmit reviews related, to the merchant (e.g., past consumer reviews of the merchant or of items provided by the merchant) and to the consumer (e.g., past merchant reviews of the consumer for previously requested items). Once the offer is accepted, the non-catalog service may help complete the transaction by receiving a payment from the consumer and disbursing the payment to the merchant.

At operation 816, the non-catalog service may provide post transaction services. For example, the non-catalog service may allow the consumer and/or the merchant to rate the transaction, track a delivery status, track a payment status, resolve customer complaints, and/or other related services.

Figure 9:
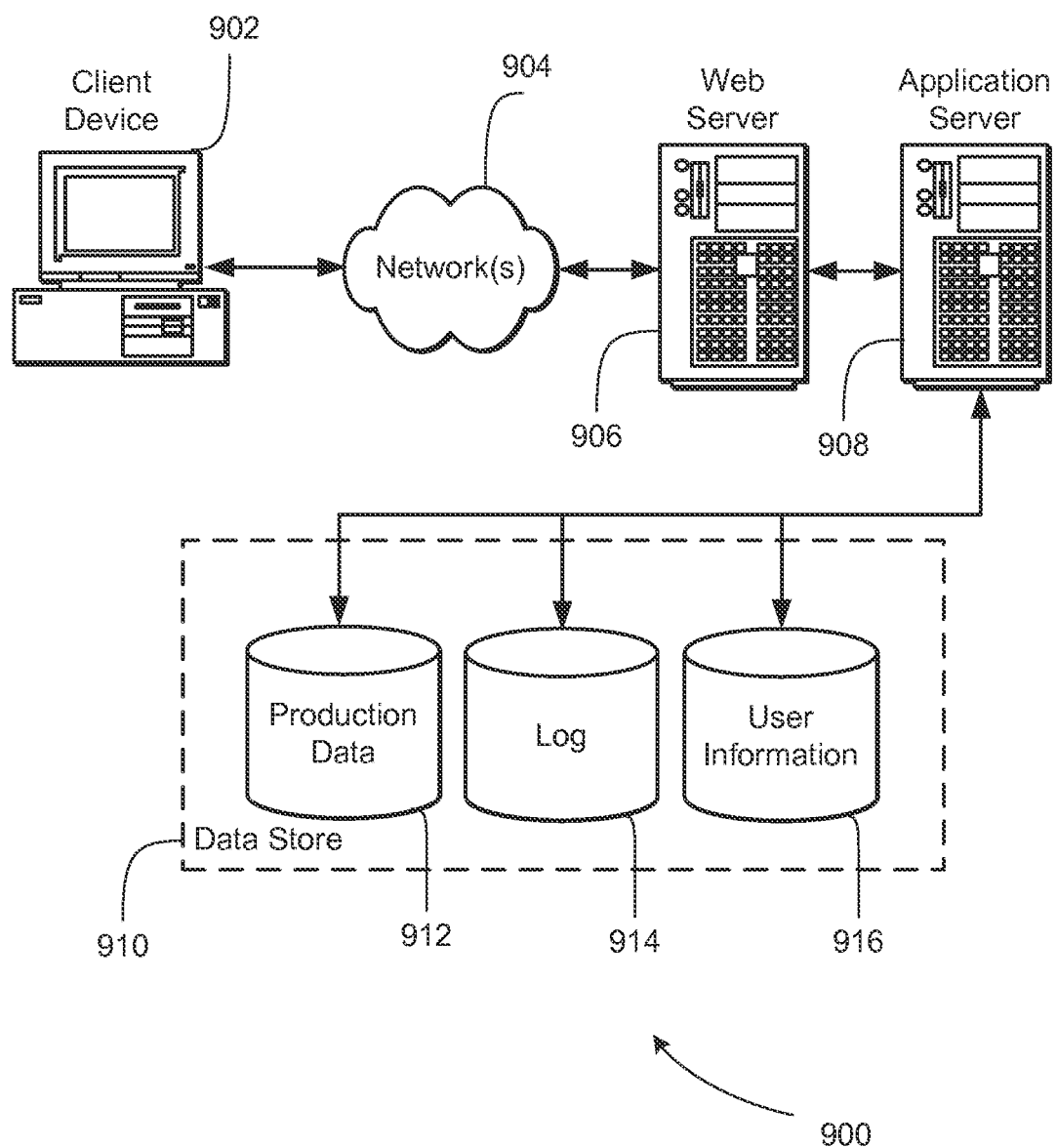
FIG. 9 illustrates an example environment in which various embodiments can be implemented.

Turning to FIG. 9, the figure illustrates aspects of an example environment 900 capable of implementing the above-described structures and functions. As will be appreciated, although a Web-based environment is used for purposes of explanation, different environments may be used, as appropriate, to implement various embodiments. The environment includes an electronic client device 902, which can include any appropriate device operable to send and receive requests, messages, or information over an appropriate network(s) 904 and convey information back to a user of the device. Examples of such client devices include personal computers, cell phones, handheld messaging devices, laptop computers, set-top boxes, personal data assistants, electronic book readers, or any other computing device. The network (s) 904 can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof In this example, the network includes the Internet, and the environment includes a Web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and/or retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server 908 provides access control services in cooperation with the data store 910, and is able to generate content such as text, graphics, audio files and/or video files to be transferred to the user, which may be served to the user by the Web server in the form of HTML, XML or another appropriate structured language in this example. The handling of all requests and responses, as well as the delivery of content between the client device 902 and the application server 909, can be handled by the Web server 906. It should be understood that the Web and application servers 906 and 908 are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store 910 illustrated includes mechanisms for storing production data 912 and user information 916, which can be used to serve content for the production side. The data store 910 is also shown to include a mechanism for storing log data 914, which can be used for reporting, analysis, or other such purposes. It should be understood that there can be many other aspects that may need to be stored in the data store 910, such as for page image information and to access correct information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a web page that the user is able to view via a browser on the client device 902. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of environment 900 in FIG. 9 should be taken as being illustrative in nature, and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network., a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) may also be capable of executing programs or scripts in response to requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network in a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from. that described above, For example, customized hardware might also be used and/or particular elements might be implemented in hardware, software (including portable software, such as applets) or both. Further, connection to other computing devices such as network input/output devices may be employed.

Storage media and computer-readable media for containing code, or portions of code, can include any appropriate media known or used in the art, including storage media and. communication media, such as, but not limited to, volatile and non-volatile, removable and non-removable media implemented in any method or technology for storage and/or transmission of information such as computer-readable instructions, data structures, program modules or other data, including RAM, ROM, EEPROM, flash memory or other memory technology, CD-ROM, DVD, or other optical storage, magnetic cassettes, magnetic tape, magnetic disk storage or other magnetic storage devices or any other medium which can he used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as that included in the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z in order for each to be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
receiving, by a computer system configured to facilitate an electronic marketplace, a request for an item, the request received from a user computing device and comprising a description of the item;
determining, by the computer system, that the item is unavailable from the electronic marketplace based at least in part on a search of one or more data stores storing electronic templates of available items from the electronic marketplace, the electronic marketplace comprising a plurality of network-based resources associated with different top-level domains and the one or more data stores comprising a plurality of catalogs corresponding to the plurality of network-based resources, and wherein determining that the item is unavailable from the electronic marketplace comprises searching the plurality of catalogs for a match of the item;
generating, by the computer system, an electronic template for the item based at least in part on the determination that the item is unavailable and the description of the item received from the user computing device;
providing, by the computer system, an interface comprising summary information about the request to a plurality of provider computing devices, the summary information comprising a link to the electronic template for the item, the plurality of provider computing devices associated with a plurality of item providers having accounts at the electronic marketplace, the accounts configured with subscriptions to receive transmitted requests for items unidentified in the one or more data stores;

receiving, by the computer system, an indication that the link has been selected, the link being selected using the interface at a provider computing device of a particular item provider of the plurality of item providers;

responsive to receiving the indication that the link has been selected, transmitting, by the computer system to the provider computing device, information from the electronic template for the item;

providing, by the computer system to the provider computing device, an offer option to offer the item based at least in part on the electronic template, the offer option allowing the item to be offered independently of identifying the item in the one or more data stores as an available item from the electronic marketplace; and facilitating, by the computer system, a data exchange between the user computing device and the provider computing device, the facilitation of the data exchange comprising at least the electronic template.

2. The computer-implemented method of claim 1, further comprising providing, after receiving the request for the item, a catalog option to the provider computing device for adding the item to a catalog as an available item from the electronic marketplace to potential users.

3. The computer-implemented method of claim 1, further comprising:

providing, to the user computing device, a request option to request the item from an unspecified item provider; and receiving, from a computing device of the user, a user selection of the request option for the item, wherein providing the request comprises providing data about requests of other users for other items unavailable from the electronic marketplace and providing a recommendation for another item based at least in part on the user selection of the request option, and wherein transmitting information about the request comprises transmitting a trend of requesting the item and a filter option for filtering the information based at least in part on the trend.

4. One or more non-transitory computer-readable storage media storing computer-executable instructions that, when executed by one or more computer systems, configure the one or more computer systems to perform operations comprising:

determining that an item is unavailable from a network-based source based at least in part on a description from a request for the item, the request received from a user computing device, the network-based source comprising a plurality of marketplaces associated with different top-level domains and one or more data stores comprising a plurality of catalogs corresponding to the plurality of marketplaces, and wherein determining that the item is unavailable from the network-based source comprises searching the plurality of catalogs for a match of the item;

generating an electronic template describing the item based at least in part on the item being unavailable from the network-based source and the description of the item received from the user computing device;

providing an interface comprising summary information about the request to a set of provider computing devices, the set of provider computing devices corresponding to item providers that are subscribed to receiving the summary information, the summary information comprising a link to the electronic template;

receiving an indication that the link has been selected, the link being selected using the interface at a provider computing device of the set of provider computing devices;

responsive to receiving the indication that the link has been selected, transmitting, to the provider computing device, information from the electronic template for the item and an item provider option for allowing the item to be offered independently of identifying the item in one or more data stores of the network-based source;

receiving, from the provider computing device, an indication that the item provider option has been selected at the interface; and facilitating a data exchange between the user computing device and the provider computing device, the facilitation of the data exchange comprising information from the electronic template.

5. The one or more non-transitory computer-readable storage media of claim 4, wherein the description of the item comprises one or more of a text, an image, a barcode, or audio information about the item.

6. The one or more non-transitory computer-readable storage media of claim 4, wherein the network-based source is configured to offer items based at least in part on receiving descriptions of the items from item providers and updating a structure for listing the items as available from the network-based source prior to offering the items to users, and wherein the structure comprises a catalog of the items.

7. The one or more non-transitory computer-readable storage media of claim 6, wherein the structure comprises documents describing the items and documents generated based at least in part on input of the item providers, wherein the electronic template comprises a document that is a version of the documents, includes one or more of: a title field, a description field, or a price range field, and is generated based at least in part on the request and a description of the item received from a user computing device, and wherein the electronic template enables the item to be offered without requesting the item providers to update the structure for listing the item as available from the network-based source.

8. The one or more non-transitory computer-readable storage media of claim 4, wherein the computer-executable instructions that, when executed by the one or more computer systems, further configure the one or more computer systems to perform operations comprising:

providing a user option to request the item based at least in part on determination that the item is unavailable from the network-based source, wherein providing the user option to request the item comprises providing a user interface that includes an information field identifying the item as unavailable from the network-based source and a request field to request the item from an unspecified item provider; and receiving a request for the item based at least in part on the user option.

9. The one or more non-transitory computer-readable storage media of claim 4, wherein transmitting the information about the item comprises:

associating the electronic template with a tag; and providing a filter option for displaying the summary information based at least in part on the tag.

10. The one or more non-transitory computer-readable storage media of claim 4, wherein determining that the item is unavailable comprises determining whether the item comprises a modified version of an existing item from items available from the network-based source or whether the item comprises a design of a new item, and wherein generating the electronic template comprises adding an indication of the modified version or the design to the electronic template.

11. The one or more non-transitory computer-readable storage media of claim 4, wherein facilitating the data exchange comprises:
receiving, from the provider computing device, an offer to provide the item, the offer comprising additional information related to the item;
updating the electronic template with an indication of the offer and the additional information;
transmitting the updated electronic template to the user;
providing the user with an accept option based at least in part on updating the electronic template;
receiving a user selection of the accept option; and
transmitting an indication to the provider computing device that the user accepted the offer based at least in part on updating the electronic template and the user selection.

12. The one or more non-transitory computer-readable storage media of claim 11, further comprising:
receiving data indicative of a commitment of an item provider to provide the item to the user based at least in part on updating the electronic template; and
providing a plurality of selectable options to the item provider based at least in part on the commitment, the plurality of selectable options comprising one or more of: a time range from predefined ranges for providing the item, a sign-up for a customer service support provided by a service provider, or an input to update a structure and add the item to the items available from the network-based source.

13. A system, comprising:
a memory configured to store computer-executable instructions; and
a processor configured to access the memory and execute the computer-executable instructions to collectively at least:
receive a request for an item from a user computing device;
determine that the item is unavailable from a network-based resource, the network-based resource comprising a plurality of marketplaces associated with different top-level domains and one or more data stores comprising a plurality of catalogs corresponding to the plurality of marketplaces, and wherein determining that the item is unavailable from the network-based resource comprises searching the plurality of catalogs for a match of the item;
generate an electronic template for item providers to offer the item to users based at least in part on the request;
provide an interface comprising summary information about the request to a set of provider computing devices, the set of provider computing devices corresponding to item providers that are subscribed to receiving the summary information, the summary information comprising a link to the electronic template;
receive an indication that the link has been selected, the link being selected using the interface at a provider computing device of the set of provider computing devices;
responsive to receiving the indication that the link has been selected, transmit, to the provider computing device, information from the electronic template for the item and an item provider option for allowing the item to be offered independently of identifying the item in one or more data stores of the network-based resource;
receive, from the provider computing device, an additional indication that the item provider option has been selected; and
perform a data exchange between the user computing device and the provider computing device based at least in part on the additional indication that the item provider option has been selected, the data exchange comprising at least the electronic template.

14. The system of claim 13, wherein the data is published on a dashboard interface, wherein the dashboard interface is configured to identify the item, the request, and other requests for the item from other users.

15. The system of claim 14, wherein the dashboard interface is further configured to provide a predictive tool configured to analyze past requests and provide analytics associated with potential requests.

16. The system of claim 15, wherein the analytics are generated based at least in part on one or more categories comprising at least one of: words, tags, item types, seasons, or geographical regions associated with potential requests.

17. The system of claim 14, wherein the dashboard interface comprises a setting option to subscribe to particular published data associated with an item category or a request category.

18. The system of claim 17, wherein the computer-executable instructions, when executed by the processor configured, further cause the system to at least: provide a recommendation to the user computing device about another item based at least in part on the request and the particular published data.

19. The system of claim 13, wherein the computer-executable instructions, when executed by the processor configured, further cause the system to at least provide reviews related to at least one of an item provider, a user, or past requested items.

* * * * *